United States Patent
Martini et al.

(10) Patent No.: US 10,603,896 B2
(45) Date of Patent: Mar. 31, 2020

(54) INSTALLATION AND PROCESS FOR RECYCLING WIPING SOLUTION OF ONE OR MORE INTAGLIO PRINTING PRESSES

(71) Applicant: KBA-NotaSys SA, Lausanne (CH)

(72) Inventors: Giacomo Martini, Segrate (IT); Veronique Nery, Boussens (CH)

(73) Assignee: KBA-NOTASYS SA, Lusanne (CH)

( * ) Notice: Subject to any disclaimer, the term of this patent is extended or adjusted under 35 U.S.C. 154(b) by 222 days.

(21) Appl. No.: 15/642,264

(22) Filed: Jul. 5, 2017

(65) Prior Publication Data

US 2017/0297325 A1    Oct. 19, 2017

Related U.S. Application Data

(62) Division of application No. 13/582,070, filed as application No. PCT/IB2011/050891 on Mar. 2, 2011, now abandoned.

(30) Foreign Application Priority Data

Mar. 5, 2010  (EP) .................................... 10155645

(51) Int. Cl.
*B01D 21/00* (2006.01)
*B41F 35/00* (2006.01)
(Continued)

(52) U.S. Cl.
CPC .......... *B41F 35/00* (2013.01); *B41P 2235/31* (2013.01); *C02F 1/001* (2013.01); *C02F 1/38* (2013.01);
(Continued)

(58) Field of Classification Search
CPC .... B01D 21/00; B01D 21/0012; B01D 21/01; B01D 21/02; B01D 21/26; B01D 21/262;
(Continued)

(56) References Cited

U.S. PATENT DOCUMENTS

| 3,247,106 | A | * | 4/1966 | Sopoci | ................... | B01D 21/01 |
| | | | | | | 210/714 |
| 4,127,440 | A | * | 11/1978 | Barkman | ............... | B01D 37/00 |
| | | | | | | 162/190 |
| 2003/0029805 | A1 | * | 2/2003 | Martini | ................... | B41F 35/00 |
| | | | | | | 210/723 |

FOREIGN PATENT DOCUMENTS

DE      101 63 340 A1    7/2003
EP         0826502 A1    3/1998
(Continued)

OTHER PUBLICATIONS

Tramfloc, Webpage (Year: 2013).*
Office Action dated Aug. 21, 2018 issued in Indian Application No. 7261/DELNP/2012 with English language translation (7 pages).

*Primary Examiner* — Allison G Fitzsimmons
(74) *Attorney, Agent, or Firm* — Nixon & Vanderhye P.C.

(57) ABSTRACT

There is described an installation (01; 02) for recycling wiping solution of one or more intaglio printing presses (10) comprising a flocculation tank (12) for inducing flocculation of ink constituents contained in waste solution coming from the one or more intaglio printing presses (10), a processing tank (14) for pre-treating the waste solution for subsequent filtering, and a filtering unit (15), preferably a filter press unit, for filtering the waste solution coming from the processing tank (14) and producing recycled solution at an output of the filtering unit (15), which recycled solution is recycled to produce fresh wiping solution for use by the one or more intaglio printing presses (10). According to one embodiment, the installation (01) further comprises a centrifugation unit (13) for separating the waste solution coming from the flocculation tank (12) by centrifugation into precipitate and centrifuged supernatant, which centrifuged supernatant is fed to the processing tank (14). According to a second embodiment, the installation (02) further comprises
(Continued)

a decantation unit (13a) for separating the waste solution coming from the flocculation tank (12) by decantation into precipitate and decanted supernatant, which decanted supernatant is fed to the processing tank (14), and a centrifugation unit (13b) for further separating the precipitate produced by the decantation unit (13a) by centrifugation into further precipitate and centrifuged supernatant, which centrifuged supernatant is fed to the processing tank (14). There are also described corresponding processes for recycling wiping solution.

54 Claims, 4 Drawing Sheets (51) Int. Cl.
C02F 1/00 (2006.01)
C02F 1/38 (2006.01)
C02F 1/52 (2006.01)
C02F 103/34 (2006.01)

(52) U.S. Cl.
CPC ............... C02F 1/385 (2013.01); C02F 1/52 (2013.01); C02F 2103/34 (2013.01)

(58) Field of Classification Search
CPC .... B01D 37/00; B01D 37/03; B01D 2317/08; B01D 2317/00; B01D 2317/02; C02F 1/00; C02F 1/001; C02F 1/004; C02F 1/006; C02F 1/38; C02F 1/385; C02F 1/52; C02F 1/5236; C02F 1/5281; C02F 2001/007; C02F 9/00; C02F 2103/26; C02F 2103/28; C02F 2301/00; C02F 2301/02; C02F 2301/04; C02F 2301/08
USPC ....... 210/638, 639, 650, 702, 703, 704, 705, 210/710, 712, 723, 767, 787, 805, 433.1
See application file for complete search history.

(56) References Cited

FOREIGN PATENT DOCUMENTS

| | | |
|---|---|---|
| EP | 0 927 632 A1 | 7/1999 |
| JP | 11-245366 | 9/1999 |

* cited by examiner

INSTALLATION AND PROCESS FOR RECYCLING WIPING SOLUTION OF ONE OR MORE INTAGLIO PRINTING PRESSES

This application is a divisional of U.S. patent application Ser. No. 13/582,070 filed 31 Aug. 2012, which is the U.S. national phase of International Application No. PCT/IB2011/050891 filed 2 Mar. 2011 that designated the U.S. and claims priority to EP 10155645.4 filed 5 Mar. 2010, the entire contents of each of which are hereby incorporated by reference.

TECHNICAL FIELD

The present invention generally relates to installations and processes for recycling wiping solution of one or more intaglio printing presses.

BACKGROUND OF THE INVENTION

The expression "intaglio printing" as used herein refers to direct plate printing using engraved printing mediums (e.g. engraved plates or cylinders) as commonly applied for the production of banknotes and security documents. The expression "steel/copper engraving printing" is also sometimes used to refer to this particular printing process. Banknotes, for example, are typically provided with intaglio-printed patterns (such as portraits or other pictorial representations, latent images, guilloche patterns, denominations, bank designation, etc.) which are readily recognizable by touch due to the embossing and tactile effect inherent to intaglio printing. Intaglio printing presses for carrying out intaglio printing are for instance known from European Patent Applications Nos. EP 0 091 709 A1, EP 0 406 157 A1, EP 0 563 007 A1, EP 0 873 866 A1, EP 1 602 482 A1 and International Application No. WO 03/047862 A1, all in the name of the present Applicant and incorporated herein by reference.

Intaglio printing requires application of an excess of ink onto the engraved printing mediums and wiping of the thus inked printing mediums prior to printing in order to remove the excess of ink outside of the engravings. In order to carry out this wiping operation, intaglio printing presses are commonly equipped with so-called wiping systems that typically comprise a wiping roller assembly as disclosed in the above-identified patent applications. One example of such a wiping system comprising a wiping roller assembly is disclosed in International Application No. WO 2007/116353 A1 in the name of the present Applicant which is also incorporated herein by reference.

There is no particular need to presently discuss the structure of wiping systems in more detail as the particular structure of such wiping systems does not directly impact on the subject-matter of the instant invention. For the purpose of the present invention, it suffices to understand that wiping systems for intaglio printing presses typically make use of so-called wiping solution (as for instance discussed in International Application No. WO 2007/116353 A1) to assist the wiping operation and the removal of ink residues from the wiping system and to ensure proper printing quality.

Wiping systems that do not make use of wiping solution are also known in the art but are now rarely used in contemporary intaglio printing presses.

Installations and processes for recycling the wiping solution of intaglio printing presses have been disclosed. The general purpose thereof is to limit the consumption of fresh wiping solution by processing waste wiping solution coming from the intaglio printing press in such a way as to remove ink constituents and like residues contained in the waste wiping solution to produce clean solution that can be recycled to produce fresh wiping solution.

European Patent Application No. EP 0 826 502 A1 in the name of the present Applicant, the content of which is incorporated herein by reference, for instance discloses an installation and process for recycling wiping solution of an intaglio printing press, which process involves:

i. ultra-filtration of the waste solution coming from one or more intaglio printing presses in order to produce clear solution and a concentrated residual solution;

ii. recycling of the clear solution derived from the ultra-filtration as fresh wiping solution, which fresh wiping solution typically contains softened water, sulfonated castor oil (S.C.O.) and sodium hydroxide (NaOH), also referred to as "caustic soda";

iii. flocculation of the concentrated residual solution derived from the ultra-filtration using a flocculating agent, such as a mixture of calcium chloride ($CaCl_2$) and ferric chloride ($FeCl_3$), to produce a flocculated solution;

iv. filtration of the flocculated solution to produce solid waste and a filtered solution;

v. neutralisation of the filtered solution with a neutralising agent, such as hydrochloric acid (HCl) or sulphuric acid ($H_2SO_4$), to produce a neutralised solution;

vi. evaporation of the neutralised solution to produce a concentrated salty solution and distilled water;

vii. use of the distilled water for producing the fresh wiping solution; and viii. filtration of the salty solution producing solid salts and a residual liquid, which residual liquid may be used for realising the flocculation at step iii. hereabove.

European Patent Application No. EP 0 927 632 A1 in the name of the present Applicant, the content of which is incorporated herein by reference, discloses an improved installation and process for recycling wiping solution of an intaglio printing press, which process involves:

i. flocculation of the waste solution coming from one or more intaglio printing presses using a flocculating agent with particular physicochemical properties in order to produce flocculated solution containing flocculated ink constituents;

ii. separation by decantation of the flocculated solution to produce clean solution and a decanted solution with sedimented ink constituents;

iii. filtration of the decanted solution to produce filtered clean solution and solid waste;

iv. optionally, additional filtering (by ultra-filtration or mechanical filtration) of the clean solution derived from step ii. and of the filtered clean solution derived from step iii.; and v. recycling of the clean solution derived from step ii. and of the filtered clean solution derived from step iii. as fresh wiping solution, which fresh wiping solution contains softened water, sulfonated castor oil (S.C.O.) and caustic soda (NaOH), including preferably an adjustment of the concentration of sulfonated castor oil (S.C.O.) and caustic soda (NaOH) additives.

In both of the above examples, the fresh wiping solution typically contains approximately 98.5% of softened water, approximately 1% of caustic soda (NaOH) and approximately 0.5% of sulfonated castor oil (S.C.O.).

Further solutions for recycling wiping solution of intaglio printing presses are disclosed in European Patent Applications Nos. EP 0 789 000 A1, EP 1 832 333 A1, Japanese Patent Application No. JP 01-067296 A and Chinese Patent Application No. CN 1107075 A. All these other solutions are not based on any flocculation process and specifically involve an ultra-filtration step whereby the waste solution is filtered using inorganic (e.g. ceramic) or organic ultra-filtration membranes (or "UF membranes") to produce a clean filtrate than can be recycled to produce fresh wiping solution. A problem with this approach resides mainly in the fact that the pores of the UF membranes are prone to clogging, which requires frequent cleaning and, ultimately, replacement of the UF membranes. This negatively impacts on operative and maintenance costs. In that respect, use of a flocculating agent to induce flocculation of ink constituents contained in the waste wiping solution is not practical in conjunction with an ultra-filtration process as flocculation exacerbates even further clogging of the UF membranes. This is one of the reasons why, according to European Patent Application No. EP 0 826 502 A1, flocculation is performed only after ultra-filtration.

Ultra-filtration is also contemplated in European Patent Application No. EP 0 927 632 A1 to perform additional filtration of the clean solution, but this approach is also prone to clogging of the UF membranes as there always remains some ink residues in the processed solution that is subjected to ultra-filtration. According to European Patent Application No. EP 0 927 632 A1, this problem can be overcome by performing a mechanical filtration in lieu of the ultra-filtration.

There is therefore a tendency to move away from ultra-filtration when it comes to recycling wiping solution of intaglio printing presses. A known solution which does not involve an ultra-filtration process is also disclosed in European Patent Application No. EP 1 092 684 A2. This other solution involves a flocculating process similar to the one described in European Patent Application No. EP 0 826 502 A1 using a mixture of calcium chloride ($CaCl_2$) and ferric chloride ($FeCl_3$) as flocculating agent. The use of calcium chloride ($CaCl_2$) within the recycling loop of the system has however demonstrated in practice to be detrimental to the proper operation of the associated intaglio printing press(es) as calcium chloride ($CaCl_2$) favours rusting and oxidisation of metallic parts of the printing press(es), which problems one evidently wishes to avoid as much as possible.

According to European Patent Application No. EP 1 092 684 A2, the flocculated solution is filtered to separate it into sludge and a filtrate, which filtrate is then heated to recover distilled water. This distilled water is in effect the only constituent, out of all components contained in the waste wiping solution, that is recycled, according to this solution, to serve as raw material for producing new wiping solution. This means that the recycling yield of this solution is comparatively lower than that of other known solutions where more than simply distilled water is recycled.

European Patent Application No. EP 1 092 684 A2 additionally provides for a further treatment of concentrated solution that is produced as a result of heating of the filtrate, which further treatment involves supplying the concentrated solution onto a heating drum and heating this concentrated solution to evaporate the liquid components of the concentrated solution into vapour, while permitting solid residues (or "salts") contained in the concentrated solution to be deposited on the surface of the heating drum.

German Patent Application No. DE 101 63 340 A1 discloses a process and installation for recycling cleaning solution used for cleaning printing presses wherein an emulsion-breaker ("Emulsionsspalter" in German) is added to the waste cleaning solution and wherein a phase separation of the waste cleaning solution is carried out using a decanting unit or, by way of an alternative, using a centrifuge. No particular reference is made in this document to the treatment of wiping solution of intaglio printing presses.

There therefore remains a need for further improvements of installations and processes for recycling wiping solution of intaglio printing presses.

SUMMARY OF THE INVENTION

A general aim of the invention is therefore to provide an improved installation and process for recycling wiping solution of intaglio printing presses.

More particularly, an aim of the invention is to provide such an installation and process involving flocculation of the ink constituents contained in the waste solution and which is more efficient in terms of usage of the necessary chemical agents.

Another aim of the invention is to maximise the recycling yield of the system so as to limit the consumption of the required constituents used to produce fresh wiping solution.

Yet another aim of the invention is to provide such an installation and process which are convenient and relatively simple to operate, respectively to carry out, while also simplifying necessary maintenance operations.

These aims are achieved thanks to the invention defined in the annexed claims.

According to a first embodiment, there is provided an installation for recycling wiping solution of one or more intaglio printing presses, comprising
 a flocculation tank for inducing flocculation of ink constituents contained in waste solution coming from the one or more intaglio printing presses;
 a centrifugation unit for separating the waste solution coming from the flocculation tank by centrifugation into precipitate and centrifuged supernatant;
 a processing tank for pre-treating the centrifuged supernatant coming from the centrifugation unit for subsequent filtering; and
 a filtering unit, preferably a filter press unit, for filtering the waste solution coming from the processing tank and producing recycled solution at an output of the filtering unit, which recycled solution is recycled to produce fresh wiping solution for use by the one or more intaglio printing presses.

There is also provided a corresponding process for recycling wiping solution of one or more intaglio printing presses, comprising the following steps:
 i. inducing flocculation of ink constituents contained in waste solution coming from the one or more intaglio printing presses to produce a flocculated solution;
 ii. separating the flocculated solution by centrifugation into precipitate and centrifuged supernatant;
 iii. pre-treating the centrifuged supernatant to produce a pre-treated solution for subsequent filtering; and
 iv. filtering the pre-treated solution to produce a recycled solution, which recycled solution is recycled to produce fresh wiping solution for use by the one or more intaglio printing presses.

According to a second embodiment, there is provided an installation for recycling wiping solution of one or more intaglio printing presses, comprising:
 a flocculation tank for inducing flocculation of ink constituents contained in waste solution coming from the one or more intaglio printing presses;

a decantation unit for separating the waste solution coming from the flocculation tank by decantation into precipitate and decanted supernatant;

a centrifugation unit for further separating the precipitate produced by the decantation unit by centrifugation into further precipitate and centrifuged supernatant;

a processing tank for pre-treating the decanted supernatant coming from the decantation unit and the centrifuged supernatant coming from the centrifugation unit for subsequent filtering; and a filtering unit, preferably a filter press unit, for filtering the waste solution coming from the processing tank and producing recycled solution at an output of the filtering unit, which recycled solution is recycled to produce fresh wiping solution for use by the one or more intaglio printing presses.

There is also provided a corresponding process for recycling wiping solution of one or more intaglio printing presses, comprising the following steps:

i. inducing flocculation of ink constituents contained in waste solution coming from the one or more intaglio printing presses to produce a flocculated solution;

ii. separating the flocculated solution by decantation into precipitate and decanted supernatant;

iii. further separating the precipitate of the decantation by centrifugation into further precipitate and centrifuged supernatant;

iv. pre-treating the decanted supernatant and the centrifuged supernatant to produce a pre-treated solution for subsequent filtering; and v. filtering the pre-treated solution to produce a recycled solution, which recycled solution is recycled to produce fresh wiping solution for use by the one or more intaglio printing presses.

There is further provided a use of centrifugation to process waste wiping solution of one or more intaglio printing presses, which use involves subjecting to centrifugation a flocculated solution produced as a result of flocculation of the waste wiping solution or a derivative of the flocculated solution to separate clarified solution for further processing.

One of the main advantages of the proposed solutions resides in the fact that they require a lesser amount of chemical processing agents, especially filter aid agents, while still achieving a high recycling efficiency.

The use of centrifugation in the context of a recycling system involving flocculation of the ink constituents as presently proposed is furthermore a particularly efficient way of separating the greater portion of the ink constituents contained in the waste solution upstream of the filtering unit, which leads to less frequent maintenance operations on the filtering unit itself. This therefore positively impacts on the operative and maintenance costs.

Further advantageous embodiments of the invention form the subject-matter of the dependent claims and are discussed below.

BRIEF DESCRIPTION OF THE DRAWINGS

Features and advantages of the present invention will appear more clearly from reading the following detailed description of embodiments of the invention which are presented solely by way of non-restrictive examples and are illustrated by the attached drawings in which.

DETAILED DESCRIPTION OF EMBODIMENTS OF THE INVENTION

Figure 1:
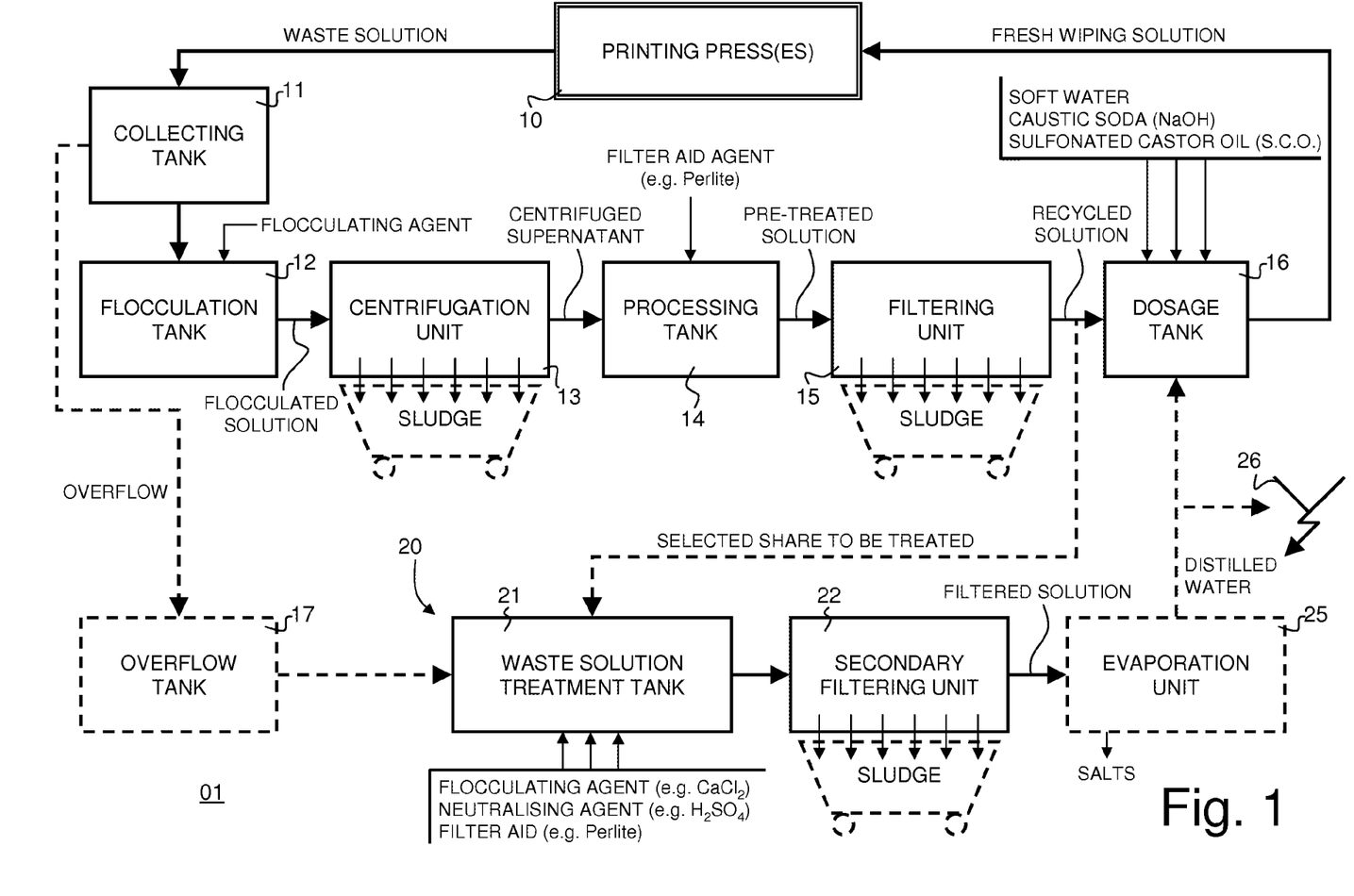
FIG. 1 is a block diagram of an installation for recycling wiping solution according to a first embodiment of the invention.

FIG. 1 shows a block diagram of an installation for recycling wiping solution according to a first embodiment of the invention, which installation is generally designated by reference numeral 01.

Reference numeral 10 schematically designates one or more intaglio printing presses to which the installation 01 is coupled to form a closed loop where waste solution coming from the one or more intaglio printing presses 10 is recycled to produce fresh wiping solution that is used again by the one or more intaglio printing presses 10. The expression "waste solution" as referred to herein is used to generally designate the used solution that is gathered from the intaglio printing press(es) 10 and processed throughout the installation. This expression indifferently designates the solution at different stages of the process, whether it is the waste solution coming directly from the intaglio printing press(es) 10, flocculated solution (as referred to herein), any derivative of the flocculated solution, pre-treated solution (as also referred to herein), or any other solution that has to undergo some treatment.

The intaglio printing presses 10 can be any type of intaglio printing presses equipped with a wiping system that makes use of wiping solution as cleaning medium, as for instance disclosed in European Patent Applications Nos. EP 0 091 709 A1, EP 0 406 157 A1, EP 0 563 007 A1, EP 0 873 866 A1, EP 1 602 482 A1 and International Application No. WO 03/047862 A1, all in the name of the present Applicant.

As already mentioned, the particular structure of the wiping systems does not directly impact on the subject-matter of the present invention. For the purpose of the present invention, it suffices to understand that wiping systems for intaglio printing presses typically make use of wiping solution (as for instance discussed in International Application No. WO 2007/116353 A1) to assist the wiping operation and the removal of ink residues from the wiping system and to ensure proper printing quality.

In the context of the present invention, the wiping solution may be of the same type as already disclosed in European Patent Applications Nos. EP 0 826 502 A1 and EP 0 927 632 A1, i.e. solution consisting of approximately 98.5% of soft water, 1% of caustic soda (NaOH) and 0.5% of sulfonated castor oil (S.C.O.). Other wiping solution compositions may however be contemplated without departing from the scope of the invention.

The installation 01 of FIG. 1 preferably comprises a collecting tank 11 for collecting waste solution from the intaglio printing press(es) 10, a flocculation tank 12 for inducing flocculation of ink constituents contained in the waste solution, a processing tank 14 for pre-treating the waste solution derived from the collecting tank 11, a filtering unit 15 for filtering the waste solution coming from the processing tank 14 (also referred to hereinafter as the "pre-treated solution") to produce recycled solution, and a dosage tank 16 for collecting the recycled solution coming from the filtering unit 15 and dosing addition of fresh constituents to produce fresh wiping solution.

The collecting tank 11 is advantageous from a practical point of view, but the function thereof (i.e. collecting waste solution) may be combined with that of the downstream-located flocculation tank 12. Similarly, the dosage tank 16 is advantageous from a practical point of view as it serves to adequately collect the recycled solution and facilitates the production of the necessary fresh wiping solution. As far as the basic principle of the invention is concerned, whether or not a collecting tank and/or a dosage tank is/are provided is as such irrelevant. The provision of such tanks is however advantageous in the context of improvements of the invention which will be discussed hereinafter. It shall also be understood that additional tanks might be provided in practice along the tanks already mentioned hereinabove, without departing from the scope of the invention as defined by the annexed claims.

The flocculation tank 12 receives a supply of an adequate flocculating agent (or "reagent") that induces flocculation of the ink constituents contained in the waste solution coming from the intaglio printing press(es) 10. Such flocculating agent can in particular be of the type discussed in European Patent Application No. EP 0 927 632 A1. By virtue of the flocculation process, a flocculated solution is produced in the flocculating tank 12, i.e. a solution where the ink constituents which are dispersed in the waste solution form larger-size clusters, or "flocs", that can then be separated more easily from the solution.

According to this first embodiment, the flocculated solution is fed from the flocculation tank 12 to a centrifugation unit 13 which is designed to separate the flocculated solution by centrifugation into clarified solution (referred to hereinafter as "centrifuged supernatant"), which is further processed, and precipitate, or "sludge", which is discarded.

An advantage of the centrifugation unit 13, besides improving the recycling efficiency, also resides in the fact that substantially all of the selected flocculating agent that is added to the solution in the flocculation tank 12 is removed with the precipitate that is separated out by the centrifugation unit 13.

The centrifuged supernatant is then fed to the processing tank 14 where a filter aid agent is supplied to aid subsequent filtering by the filtering unit 15. The filter aid agent is preferably Perlite, but other filter aid agents can be contemplated. Thanks to the present invention, a considerably lower quantity of filter aid agent is necessary as compared to previous solutions, which has a very favourable impact on operative costs and greatly simplifies operation and maintenance of the installation. By way of comparison, this first embodiment requires only a fraction of the quantity of filter aid agent that was necessary with the previous solutions, the consumption gain being of the order of a factor ten.

The pre-treated solution is then fed from the processing tank 14 to the filtering unit 15 for filtering. The filtering unit is preferably a filter press unit which carries out filtering by way of a mechanical operation whereby the pre-treated solution is loaded batch-wise into filtering chambers separated by filter plates which are then forced one against the other under high pressure to separate the pre-treated solution into clean solution, referred to as the "recycled solution", and sludge, which sludge is again discarded.

For the sake of illustration, it is estimated that the theoretical recycling efficiency of the installation 01 of FIG. 1 reaches 98.98%, meaning that 989.8 litres of solutions are recovered as recycled solution from a given volume of waste solution of 1000 litres coming from the intaglio printing press(es) 10.

The recycled solution is then fed to the dosage tank 16 where fresh constituents, e.g. soft water, caustic soda (NaOH) and sulfonated castor oil (S.C.O.), are added and dosed to complete and produce fresh wiping solution with the desired composition, which fresh wiping solution can be reused by the intaglio printing press(es) 10.

Additional improvements may be envisaged in addition to the above-described recycling system. In particular, it is in practice preferable to further process the solution to remove possible organic residues contained therein that would not be separated out by the above-described recycling system. Such organic residues can be residues of ink constituents or other components, such as the sulfonated castor oil (S.C.O.) that is used as constituent of the fresh wiping solution. To this end, a secondary waste solution treatment system, designated generally by reference numeral 20 in FIG. 1, is preferably provided. This secondary waste solution treatment system 20 is specifically designed to treat a selected share of the wiping solution and remove the remaining organic residues contained therein. Any appropriate share (e.g. of the order of 3%) of the wiping solution may be extracted for that purpose, whether continuously, by extracting a portion of the processed wiping solution, or semi-continuously, by periodically extracting a given volume of processed wiping solution for further treatment. Preferably, the selected share of wiping solution to be treated by the secondary waste solution treatment system 20 is taken from the recycled solution that is derived from the filtering unit 15 as all of the inorganic ink constituents (and part but not all of organic residues) have already been removed therefrom thanks to the above-described recycling system. Any appropriate means to carry out the extraction of the selected share of the wiping solution can be used, such as a conduit coupled to the output of the filtering unit 15 as schematically illustrated in FIG. 1, which conduit would comprise a valve that can be selectively opened to extract the desired share of wiping solution. A conduit comprising a pump designed to selectively extract the desired volume or quantity of wiping solution could also be used.

The secondary waste solution treatment system 20 advantageously comprises a waste solution treatment tank 21 where the wiping solution is collected and a secondary filtering unit 22 for filtering the wiping solution coming from the waste solution treatment tank 21. The waste solution treatment tank 21 receives an adequate supply of processing agents, preferably a combination of a flocculating agent that can interact with the organic residues to be separated out, such as calcium chloride ($CaCl_2$), of a neutralising agent, such as sulphuric acid ($H_2SO_4$), to neutralise the pH of the waste solution, and of a filter aid agent, such as Perlite, to aid subsequent filtering by the secondary filtering unit 22.

The secondary filtering unit 22 is preferably a filter press unit of the same type as the filtering unit 15. The sludge that is separated out by the secondary filtering unit 22 is disposed of in a suitable manner.

Optionally, an evaporation unit 25 may be further provided for subjecting the filtered solution derived from the secondary filtering unit 22 to evaporation so as to recover distilled water, which distilled water can either be recycled as fresh constituent for the production of the fresh wiping solution (in which case the recovered distilled water can be fed back to the dosage tank 16) or be simply discarded to a drain 26. The solid waste, or "salts", that is separated out by the evaporation unit 25 is disposed of in a suitable manner.

A further improvement may consist in the provision of an overflow tank 17 for collecting overflow of wiping solution from the system. In this preferred example, the overflow tank 17 is shown to be coupled to the collecting tank 11. This overflow tank 17 is useful in that the recycling system can typically only process a given volume of solution. Any overflow that might be created in the system, for instance due to a production excess of fresh wiping solution, must therefore be collected somewhere else. Advantageously, the overflow of wiping solution collected in the overflow tank 17 is fed to the secondary waste solution treatment system 20 for further processing.

Figure 2:
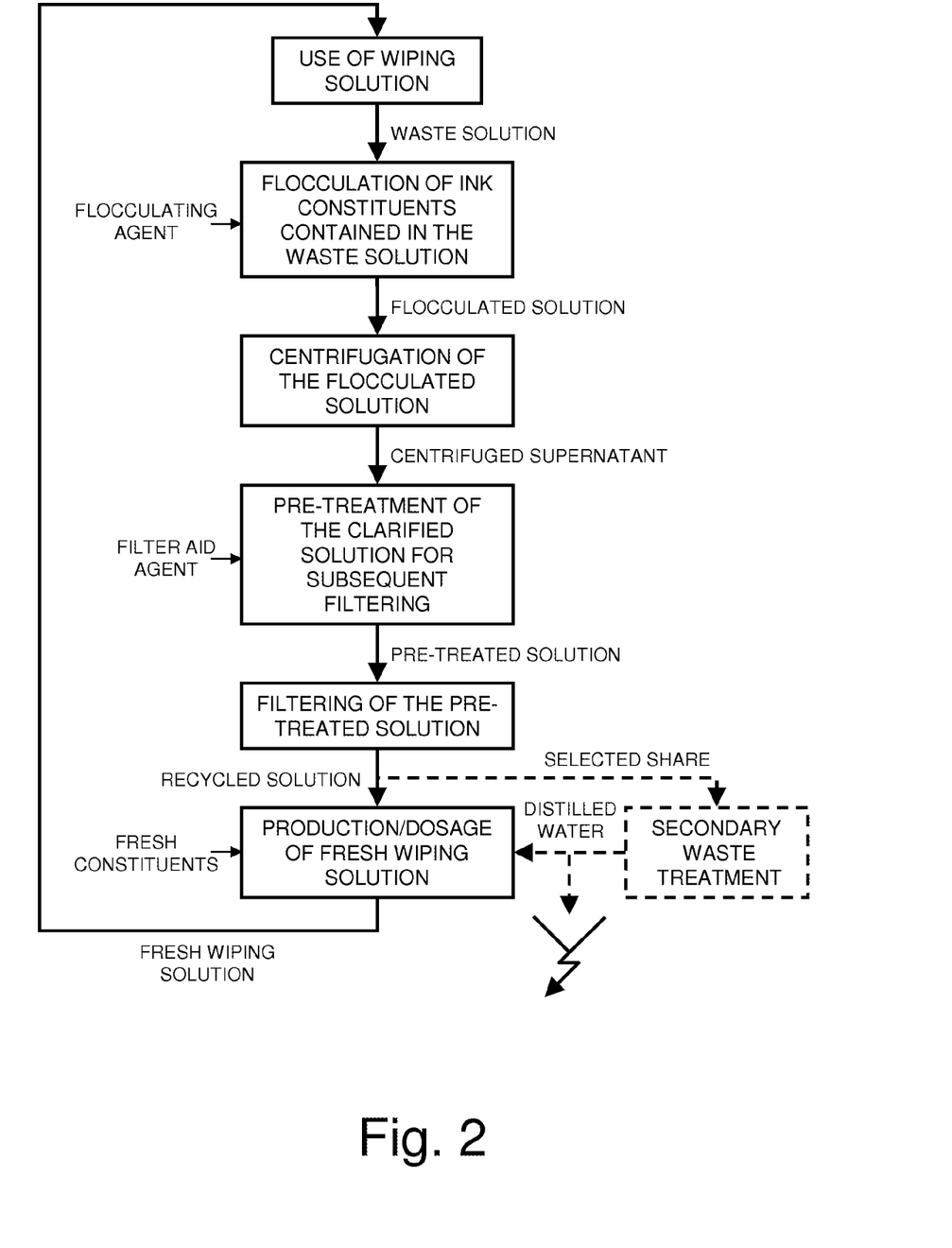
FIG. 2 is a flow chart illustrating the process that is carried out by the installation of FIG. 1.

FIG. 2 is a flow chart summarizing the recycling process that was described hereinabove in relation to the first embodiment. This flow chart is self-explanatory and lists the relevant steps of the corresponding recycling process that also forms part of the claimed subject-matter.

Figure 3:
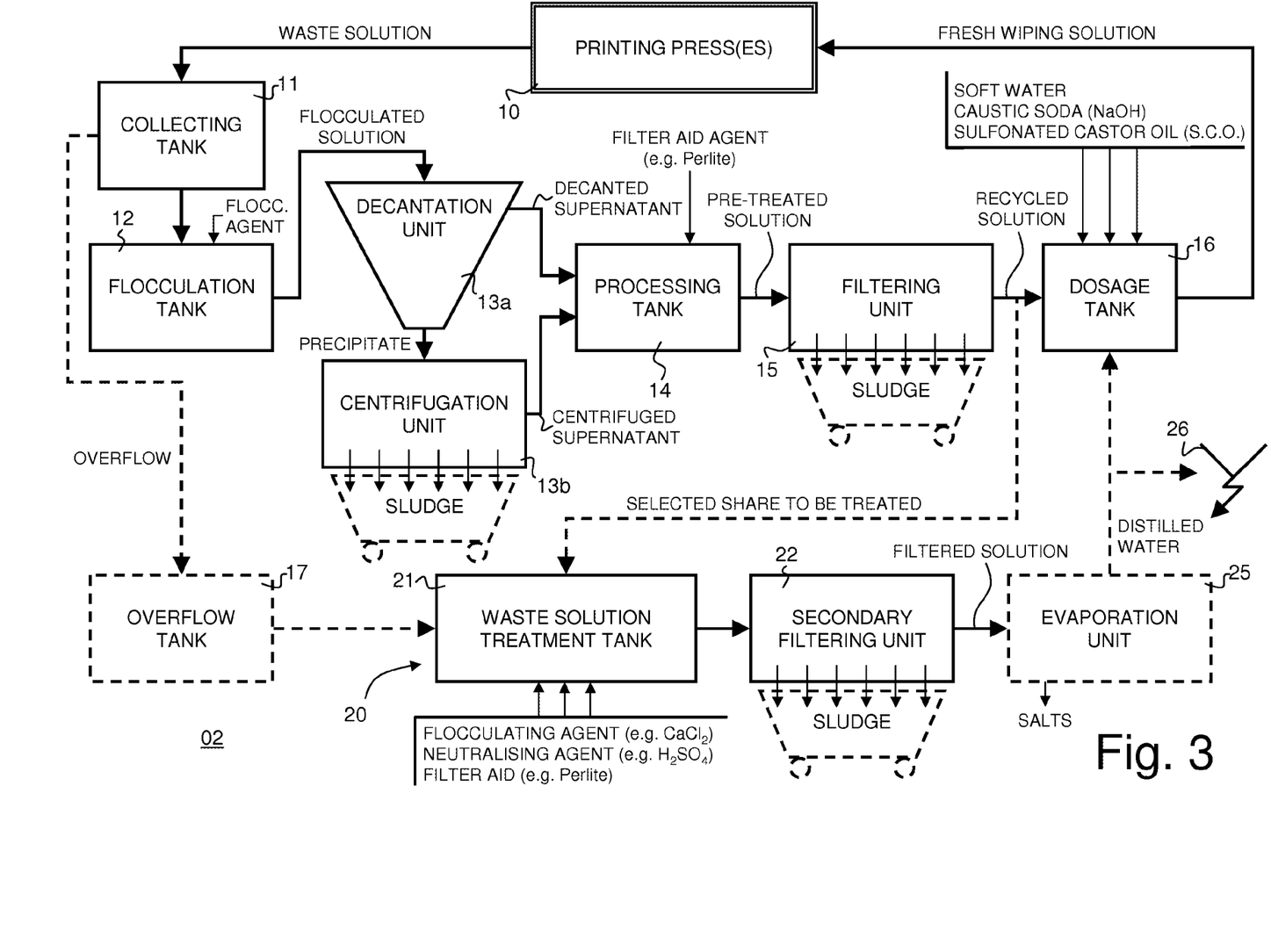
FIG. 3 is a block diagram of an installation for recycling wiping solution according to a second embodiment of the invention.

FIG. 3 shows a block diagram of an installation for recycling wiping solution according to a second embodiment of the invention, which installation is generally designated by reference numeral 02. This second embodiment shares substantial similarities with the first embodiment and the components that are common to both embodiments are identified by the same reference numerals and will not be described again.

The difference between the first and second embodiments resides in the fact that the centrifugation unit 13 of the first embodiment is replaced in the second embodiment by a combination of a decantation unit 13*a* and of a centrifugation unit 13*b* which are coupled as described below.

According to the second embodiment illustrated in FIG. 3, the flocculated solution is fed from the flocculation tank 12 to the decantation unit 13*a* which is designed to separate the flocculated solution by decantation into clarified solution (referred to hereinafter as "decanted supernatant"), which is fed to the processing tank 14, and precipitate which is further processed. The precipitate produced by the decantation unit 13*a* is further processed by the centrifugation unit 13*b* for further separation into clarified solution (again referred to hereinafter as "centrifuged supernatant"), which is fed to the processing tank 14, and further precipitate, or "sludge" which is discarded. It may therefore be appreciated that the processing tank 14 receives the clarified portions of waste solution that are separated out by the decantation unit 13*a* and the centrifugation unit 13*b*.

Again, an advantage of the centrifugation unit 13*b*, besides improving the recycling efficiency, resides in the fact that substantially all of the selected flocculating agent that is added to the solution in the flocculation tank 12 is removed with the precipitate that is separated out by the centrifugation unit 13*b*.

As compared to the first embodiment, the clarified solution that is separated out by the decantation unit 13*a* and the centrifugation 13*b* and fed to the processing tank 14 contains a slightly greater concentration of ink constituents. This means in turn that the second embodiment requires a slightly greater amount of filter aid agent to be supplied to the processing tank 14. This being said, the consumption of filter aid agent according to the second embodiment remains by far lower to the typical consumption of previous solutions with a consumption gain that is still of the order of a factor ten.

For the sake of illustration, it is estimated that the theoretical recycling efficiency of the installation 02 of FIG. 3 reaches 98.90%, meaning that 989.0 litres of solutions are recovered as recycled solution from a given volume of waste solution of 1000 litres coming from the intaglio printing press(es) 10.

The above-described second embodiment is particularly advantageous for the recycling of larger volumes of waste solution and is, in that context, more adapted than the first embodiment. Indeed, according to the second embodiment, most of the volume of the waste solution (approximately 90% of the volume of solution) is separated by the decantation unit 13*a* into the decanted supernatant and only the precipitate of the decantation (approximately 10% of the volume of solution) is processed by the centrifugation unit 13*b*. Assuming a limited centrifugation capacity, the second embodiment is therefore more adapted than the first embodiment to process large volume of waste solution.

Figure 4:
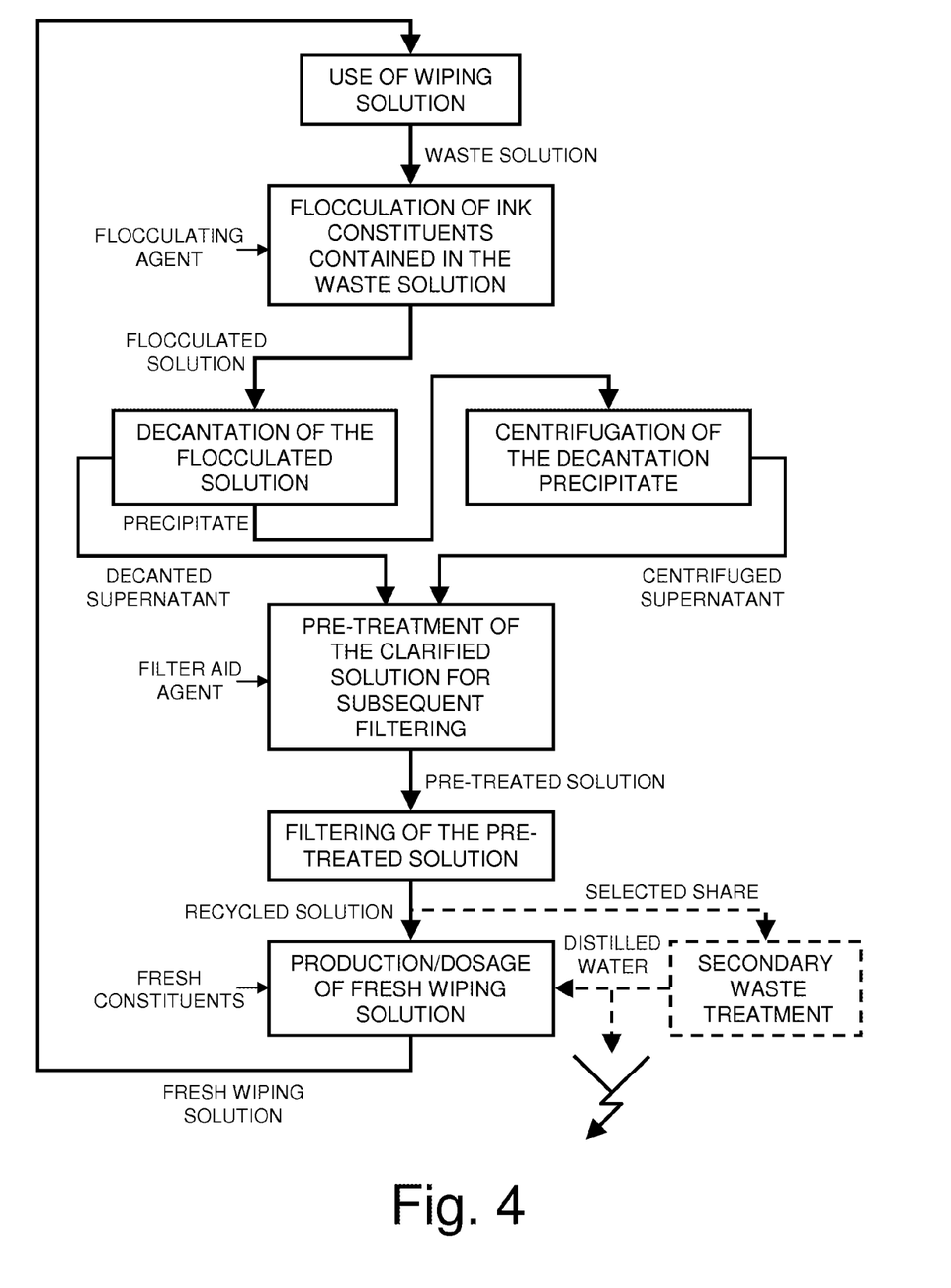
FIG. 4 is a flow chart illustrating the process that is carried out by the installation of FIG. 3.

FIG. 4 is a flow chart summarizing the recycling process that was described hereinabove in relation to the second embodiment. This flow chart is self-explanatory and lists the relevant steps of the corresponding recycling process that also forms part of the claimed subject-matter.

A further improvement of the above-described embodiments may consist in using the recycled solution derived from the filtering unit 15 as a cleaning medium for cleaning the centrifugation unit 13 or 13*b*. In such case, suitable means would be provided for selectively feeding the recycled solution derived from the filtering unit 15 back to the centrifugation unit 13 or 13*b* for the purpose of carrying out a cleaning operation of the centrifugation unit 13 or 13*b* during maintenance operations. This could for instance be achieved by providing a suitable connection or conduit between the output of the filtering unit 15 and the centrifugation unit 13 or 13*b* (not illustrated in the drawings) that would feed the recycled solution or part of it back to the centrifugation unit 13 or 13*b* during maintenance operations.

From a general perspective, it will be understood that the present invention contemplates the use of centrifugation to process waste wiping solution of one or more intaglio printing presses, which use involves subjecting to centrifugation a flocculated solution produced as a result of flocculation of the waste wiping solution or a derivative of the flocculated solution to separate clarified solution for further processing. The clarified solution that is separated by centrifugation, or centrifuged supernatant, can be recycled to produce fresh wiping solution as described above. In the context of the embodiment of FIGS. 3 and 4, the flocculated solution is first subjected to decantation to separate the flocculated solution into precipitate and decanted supernatant and only the decanted supernatant is subjected to centrifugation.

Various modifications and/or improvements may be made to the above-described embodiments without departing from the scope of the invention as defined by the annexed claims. For instance, additional tanks might be provided to collect and/or further process the waste solution.

LIST OF REFERENCES USED IN THE FIGURES AND SPECIFICATION

01 Installation for recycling wiping solution (first embodiment)
02 Installation for recycling wiping solution (second embodiment)
10 (intaglio) printing press(es)
11 collecting tank for collecting waste solution from the printing press(es) 10
12 flocculation tank for inducing flocculation of ink constituents contained in the waste solution
13 centrifugation unit for separating the waste solution (flocculated solution) coming from the flocculation tank 12 by centrifugation into precipitate and clarified solution, or "centrifuged supernatant" (first embodiment)

13a decantation unit for separating the waste solution (flocculated solution) coming from the flocculation tank 12 by decantation into precipitate and clarified solution, or "decanted supernatant" (second embodiment)

13b centrifugation unit for further separating the precipitate produced by the decantation unit 13a by centrifugation into further precipitate and clarified solution, or "centrifuged supernatant" (second embodiment)

14 processing tank for pre-treating the clarified solution coming from the centrifugation unit 13 (first embodiment), resp. the clarified solution coming from the decanting unit 13a and centrifugation unit 13b (second embodiment)

15 filtering unit (e.g. filter press unit) for filtering the waste solution (pre-treated solution) coming from the processing tank 14

16 dosage tank for collecting the recycled solution coming from the filtering unit 15 and dosing addition of fresh constituents to produce fresh wiping solution

17 overflow tank for collecting overflow of wiping solution from the system

20 secondary waste solution treatment system for treating a selected share of the wiping solution and removing organic residues contained therein

21 waste solution treatment tank for collecting the selected share of wiping solution to be treated

22 secondary filtering unit (e.g. filter press unit) for filtering the waste solution coming from the waste solution treatment tank 21

25 evaporation unit for subjecting the filtered solution coming from the secondary filtering unit 22 to evaporation/recovery of distilled water which is either recycled to produce fresh wiping solution or drained

26 drain

The invention claimed is:

1. A process of recycling a wiping solution of one or more intaglio printing presses, comprising the following steps:
   i. inducing a flocculation of ink constituents contained in a waste wiping solution coming from the one or more intaglio printing presses to produce a flocculated solution;
   ii. separating the flocculated solution by centrifugation into a precipitate and a centrifuged supernatant;
   iii. pre-treating the centrifuged supernatant to produce a pre-treated solution for subsequent filtering;
   iv. filtering the pre-treated solution to produce a recycled solution; and
   v. extracting a selected share from the recycled solution, treating the selected share, and introducing the treated selected share back into the recycled solution to form a recombined recycled solution,
   wherein the recombined recycled solution is recycled to produce a fresh wiping solution for use by the one or more intaglio printing presses.

2. The process according to claim 1, wherein the flocculation is induced at step i by adding a selected flocculating agent to the waste wiping solution, and wherein substantially all of the selected flocculating agent is removed with the precipitate that is separated out by centrifugation at step ii.

3. The process according to claim 1, wherein the pre-treated solution is produced at step iii by adding a selected filter aid agent to the centrifuged supernatant.

4. The process according to claim 3, wherein the selected filter aid agent is Perlite.

5. The process according to claim 1, further comprising the step of collecting the waste wiping solution from the one or more intaglio printing presses in a collecting tank before the flocculation at step i.

6. The process according to claim 5, further comprising the step of collecting an overflow of the waste wiping solution from the collecting tank in an overflow tank.

7. The process according to claim 6, further comprising the step of treating the overflow of the waste wiping solution collected in the overflow tank.

8. The process according to claim 7, wherein treatment of the overflow of the waste wiping solution collected in the overflow tank comprises:
   collecting and treating the overflow of the waste wiping solution collected in the overflow tank in a waste wiping solution treatment tank; and
   filtering the overflow of the waste wiping solution treated in the waste wiping solution treatment tank to produce a filtered solution.

9. The process according to claim 8, wherein the filtering of the overflow of the waste wiping solution treated in the waste wiping solution treatment tank is carried out by way of a filter press unit.

10. The process according to claim 8, further comprising the step of supplying the following processing agents into the waste wiping solution treatment tank:
    a selected flocculating agent for inducing a flocculation of ink constituents contained in the overflow of the waste wiping solution, including organic residues;
    a neutralising agent for neutralising the pH of the overflow of the waste wiping solution; and
    a filter aid agent to aid the filtering of the overflow of the waste wiping solution.

11. The process according to claim 10, wherein the selected flocculating agent is calcium chloride ($CaCl_2$).

12. The process according to claim 10, wherein the neutralising agent is sulphuric acid ($H_2SO_4$).

13. The process according to claim 10, wherein the filter aid agent is Perlite.

14. The process according to claim 8, further comprising the step of subjecting the filtered solution to evaporation so as to recover distilled water which is either recycled to produce the fresh wiping solution or drained.

15. The process according to claim 1, wherein treatment of the selected share of the recycled solution comprises:
    collecting and treating the selected share of the recycled solution in a waste wiping solution treatment tank; and
    filtering the selected share of the recycled solution treated in the waste wiping solution treatment tank to produce a filtered solution.

16. The process according to claim 15, wherein the filtering of the selected share of the recycled solution treated in the waste wiping solution treatment tank is carried out by way of a filter press unit.

17. The process according to claim 15, further comprising the step of supplying the following processing agents into the waste wiping solution treatment tank:
    a selected flocculating agent for inducing a flocculation of ink constituents contained in the selected share of the recycled solution, including organic residues;
    a neutralising agent for neutralising the pH of the selected share of the recycled solution; and
    a filter aid agent to aid filtering of the selected share of the recycled solution.

18. The process according to claim 17, wherein the selected flocculating agent is calcium chloride ($CaCl_2$).

19. The process according to claim 17, wherein the neutralising agent is sulphuric acid ($H_2SO_4$).

20. The process according to claim 17, wherein the filter aid agent is Perlite.

21. The process according to claim 15, further comprising the step of subjecting the filtered solution to evaporation so as to recover distilled water which is either recycled to produce the fresh wiping solution or drained.

22. The process according to claim 1, further comprising the step of adding fresh constituents to the recombined recycled solution to produce the fresh wiping solution.

23. The process according to claim 22, wherein the fresh constituents include soft water, caustic soda (NaOH) and sulfonated castor oil (S.C.O.).

24. The process according to claim 1, wherein the centrifugation is carried out at step ii by way of a centrifugation unit, and wherein the process further comprises the step of using part of the recycled solution for the purpose of carrying out a cleaning operation of the centrifugation unit.

25. The process according to claim 1, wherein the filtering of the pre-treated solution at step iv is carried out by way of a filter press unit.

26. A process of recycling a wiping solution of one or more intaglio printing presses, comprising the following steps:
   i. inducing a flocculation of ink constituents contained in a waste wiping solution coming from the one or more intaglio printing presses to produce a flocculated solution;
   ii. separating the flocculated solution by decantation into a precipitate and a decanted supernatant;
   iii. further separating the precipitate of the decantation by centrifugation into a further precipitate and a centrifuged supernatant;
   iv. pre-treating the decanted supernatant and the centrifuged supernatant to produce a pre-treated solution for subsequent filtering; and
   v. filtering the pre-treated solution to produce a recycled solution
   vi. extracting a selected share from the recycled solution, treating the selected share, and introducing the treated selected share back into the recycled solution to form a recombined recycled solution,
   wherein the recombined recycled solution is recycled to produce a fresh wiping solution for use by the one or more intaglio printing presses.

27. The process according to claim 26, wherein the flocculation is induced at step i by adding a selected flocculating agent to the waste wiping solution, and wherein substantially all of the selected flocculating agent is removed with the precipitate that is separated out by centrifugation at step iii.

28. The process according to claim 26, wherein the pre-treated solution is produced at step iv by adding a selected filter aid agent to the centrifuged supernatant.

29. The process according to claim 28, wherein the selected filter aid agent is Perlite.

30. The process according to claim 26, further comprising the step of collecting the waste wiping solution from the one or more intaglio printing presses in a collecting tank before the flocculation at step i.

31. The process according to claim 30, further comprising the step of collecting an overflow of the waste wiping solution from the collecting tank in an overflow tank.

32. The process according to claim 31, further comprising the step of treating the overflow of the waste wiping solution collected in the overflow tank.

33. The process according to claim 32, wherein treatment of the overflow of the waste wiping solution collected in the overflow tank comprises:
   collecting and treating the overflow of the waste wiping solution collected in the overflow tank in a waste wiping solution treatment tank; and
   filtering the overflow of the waste wiping solution treated in the waste wiping solution treatment tank to produce filtered solution.

34. The process according to claim 33, wherein the filtering of the overflow of the waste wiping solution treated in the waste wiping solution treatment tank is carried out by way of a filter press unit.

35. The process according to claim 33, further comprising the step of supplying the following processing agents into the waste wiping solution treatment tank:
   a selected flocculating agent for inducing a flocculation of ink constituents contained in the overflow of the waste wiping solution, including organic residues;
   a neutralising agent for neutralising the pH of the overflow of the waste wiping solution; and
   a filter aid agent to aid the filtering of the overflow of the waste wiping solution.

36. The process according to claim 35, wherein the selected flocculating agent is calcium chloride ($CaCl_2$).

37. The process according to claim 35, wherein the neutralising agent is sulphuric acid ($H_2SO_4$).

38. The process according to claim 35, wherein the filter aid agent is Perlite.

39. The process according to claim 33, further comprising the step of subjecting the filtered solution to evaporation so as to recover distilled water which is either recycled to produce the fresh wiping solution or drained.

40. The process according to claim 26, wherein treatment of the selected share of the recycled solution comprises:
   collecting and treating the selected share of the recycled solution in a waste wiping solution treatment tank; and
   filtering the selected share of the recycled solution treated in the waste wiping solution treatment tank to produce a filtered solution.

41. The process according to claim 40, wherein the filtering of the selected share of the recycled solution treated in the waste wiping solution treatment tank is carried out by way of a filter press unit.

42. The process according to claim 40, further comprising the step of supplying the following processing agents into the waste wiping solution treatment tank:
   a selected flocculating agent for inducing a flocculation of ink constituents contained in the selected share of the recycled solution, including organic residues;
   a neutralising agent for neutralising the pH of the selected share of the recycled solution; and
   a filter aid agent to aid filtering of the selected share of the recycled solution.

43. The process according to claim 42, wherein the selected flocculating agent is calcium chloride ($CaCl_2$).

44. The process according to claim 42, wherein the neutralising agent is sulphuric acid ($H_2SO_4$).

45. The process according to claim 42, wherein the filter aid agent is Perlite.

46. The process according to claim 40, further comprising the step of subjecting the filtered solution to evaporation so as to recover distilled water which is either recycled to produce the fresh wiping solution or drained.

47. The process according to claim 26, further comprising the step of adding fresh constituents to the recombined recycled solution to produce the fresh wiping solution.

48. The process according to claim 47, wherein the fresh constituents include soft water, caustic soda (NaOH) and sulfonated castor oil (S.C.O.).

49. The process according to claim 26, wherein the centrifugation is carried out at step iii by way of a centrifugation unit, and wherein the process further comprises the step of using part of the recycled solution produced at step v for the purpose of carrying out a cleaning operation of the centrifugation unit.

50. The process according to claim 26, wherein the filtering of the pre-treated solution at step v is carried out by way of a filter press unit.

51. The process according to claim 1, wherein the selected share of the recycled solution is drawn from the recycled solution by selectively opening a valve to extract the selected share.

52. The process according to claim 1, wherein the selected share of the recycled solution is continuously drawn from the recycled solution.

53. The process according to claim 1, wherein the selected share of the recycled solution is intermittently drawn from the recycled solution.

54. The process according to claim 1, wherein the selected share of the recycled solution is periodically drawn from the recycled solution.

* * * * *